United States Patent [19]
Aoki

[11] Patent Number: 5,267,094
[45] Date of Patent: Nov. 30, 1993

[54] DUBBING SYSTEM FOR DIGITAL INFORMATION

[75] Inventor: Akio Aoki, Tokyo, Japan

[73] Assignee: Canon Kabushiki Kaisha, Tokyo, Japan

[21] Appl. No.: 658,402

[22] Filed: Feb. 20, 1991

[30] Foreign Application Priority Data

Feb. 20, 1990 [JP] Japan .................................. 2-40236

[51] Int. Cl.$^5$ ........................... G11B 5/00; G11B 5/86
[52] U.S. Cl. ........................................ 360/32; 360/15;
 360/61; 358/141
[58] Field of Search ................. 360/32, 33.1, 15, 60,
 360/61; 358/141, 133, 310, 335

[56] References Cited

U.S. PATENT DOCUMENTS

4,975,866 12/1990 Aoki et al. ........................... 364/723
5,130,864 7/1992 Shimada ................................. 360/32

*Primary Examiner*—Robert J. Pascal
*Assistant Examiner*—Ali Meyzari
*Attorney, Agent, or Firm*—Fitzpatrick, Cella, Harper & Scinto

[57] ABSTRACT

There are provided an error correction circuit for correcting a code error of a compressed information code train having been reproduced from a recording medium, compressed in information amount by compression encoding, and added with an error correction code, by using the error correction code, an expansion circuit for subjecting the compressed information code train outputted from the error correction circuit to decoding corresponding to the compression encoding, and expanding the information amount of the decoded code train, an error concealment circuit for concealing an information code of the information code train outputted from the expansion circuit, by using correlation of the information, the information code being unable to be corrected, and a compression circuit for compression encoding again an information code train outputted from the error concealment circuit. For an information code unable to be corrected, the information code train outputted from the compression circuit is recorded in another recording medium, whereas for the other information code, the compressed information code train to be inputted to the expansion circuit is recorded in the other recording medium. Accordingly, an information code to be subjected to information expansion and second compression processes for dubbing is limited as small as possible, thereby minimizing information deterioration to be caused by such processes.

20 Claims, 4 Drawing Sheets

FIG. 1
PRIOR ART

FIG. 3A SIGNAL 46
FIG. 3B SIGNAL 48
FIG. 3C SIGNAL 54
FIG. 3D SIGNAL 58
FIG. 3E SIGNAL 56

FIG. 4

DUBBING SYSTEM FOR DIGITAL INFORMATION

BACKGROUND OF THE INVENTION

1. Field of the Invention

The present invention relates to a dubbing system, and more particularly to a dubbing system for dubbing a digital information code train whose information has been compressed by highly efficient coding and to which an error correction code has been added.

2. Related Background Art

Attention has been recently paid to digital VTRs and digital audio tape recorders (DAT), having no deterioration during dubbing.

Figure 1:
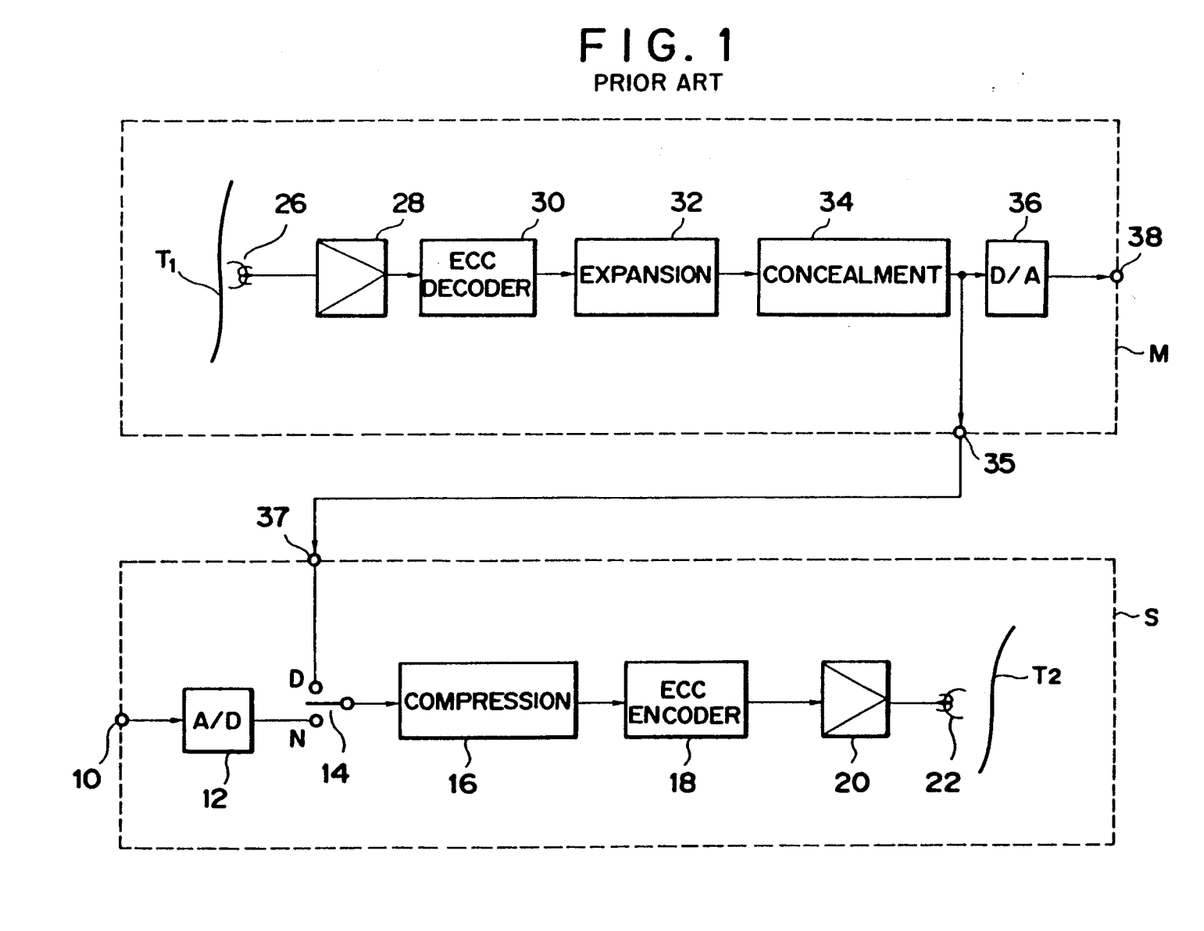
FIG. 1 is a block diagram showing an example of the structure of a conventional dubbing system.

A common structure of a dubbing system using two digital VTRs is shown in FIG. 1. In this figure, S represents a slave VTR (on the recording side), and M represents a master VTR (on the reproducing side). For the purpose of simplicity, only the reproducing system of the master VTR (M) and the recording system of the slave VTR (S) are shown in FIG. 1.

In the master VTR (M), a recorded signal of a magnetic tape T1 is converted into an electrical signal by a magnetic head 26, and amplified by a reproducing amplifier 28.

An output of the reproducing amplifier 28 is demodulated by a digital demodulator (not shown), and thereafter applied to an ECC decoder 30. The ECC decoder 30 corrects a code error generated during reproducing, by using an error correction code contained in the recorded information code train. An output of the ECC decoder 30 is supplied to an expansion circuit 32 whereat it is subjected to a process opposite to that at the time of encoding, i.e., bandwidth expansion and decoding. The output of the ECC decoder is an information code (image code) bandwidth-compressed and encoded. An output of the expansion circuit 32 is supplied to a concealment circuit 34 which conceals a reproduced code error beyond the correction capability of the ECC decoder 30, by means of a process such as interpolation using image correlation. A D/A converter 36 converts an output of the concealment circuit 34 into an analog signal which is then outputted from an output terminal 38. An output of the concealment circuit 34 is supplied to a dubbing output terminal 35.

In the slave VTR (S), a video signal inputted to an input terminal 10 is converted by an A/D converter into a digital signal which is supplied via an N contact of a switch 14 to a bandwidth compression encoding circuit 16. An ECC encoder 18 generates an error correction code for correcting a code error generated at the time of reproducing, and adds a so-called check bit to the bandwidth-compressed and encoded signal from the bandwidth compression encoding circuit 16. An output of the ECC encoder 18 is modulated by a digital modulator (not shown), and thereafter amplified by a recording amplifier 20 to be magnetically recorded on a magnetic tape T2 by a magnetic head 22.

During dubbing, an output of the concealment circuit 34 of the master VTR (M) is inputted via the terminal 35 to the dubbing input terminal 37 of the slave VTR (S). This connection is made so as to dub an error code data when a code error that can not corrected is generated in a reproduced information code data. The concealed information code train is therefore inputted to the terminal 37. The concealed code data is applied to the compression encoding circuit 16 to be subjected again to the compression encoding process, and thereafter magnetically recorded on the magnetic tape T2.

A digital VTR is not influenced by distortions on the electromagnetic conversion system, contrary to the case of an analog VTR. Therefore, image deterioration is caused only by bandwidth compression and error concealment, the latter being executed when a number of errors are generated. Further, deterioration caused by distortions on the electromagnetic conversion system of a digital VTR will not be accumulated during dubbing, which is advantageous over an analog VTR.

However, in the above-described conventional system, there is a problem of image deterioration caused by repetitive compressions and expansions if dubbing is repeated many times, because a concealed output from the concealment circuit 34 is supplied to the D contact of the switch 14 and compressed again to magnetically record it.

SUMMARY OF THE INVENTION

It is therefore an object of this invention to provide a dubbing system solving the abovedescribed problem.

It is another object of this invention to provide a dubbing system capable of minimizing information deterioration to be caused by subjecting the data from the concealment circuit again to compression and encoding during dubbing.

In view of the above objects, according to an embodiment of this invention, there is provided a dubbing system including a receiver and a transmitter, comprising:

(a) receiving means for receiving from a transmission line a compressed information code train, the compressed information code train having been compressed in information by compression encoding and having added thereto an error correction code;

(b) error correcting means for correcting a code error in the compressed information code train received by the receiving means, by using the error correction code;

(c) expanding means for expanding the information of the compressed information code train outputted from the error correcting means, by means of decoding corresponding to the compression encoding;

(d) error concealing means for concealing an information code within an information code train outputted from the expanding means, by using correlation of the information, the information code being uncorrectable by the error correcting means;

(e) compressing means for again compression encoding an information code train outputted from the error concealing means;

(f) switching means for outputting an information code train outputted from the compressing means, for the uncorrectable information code be, and outputting a compressed information code train to be inputted to the expanding means, for the other information codes; and (g) transmitting means for transmitting the information code train outputted from the switching means to another transmission line different from the transmission line from which the compressed code information train is received.

The other objects and advantages of the present invention will become apparent from the following detailed description of the embodiments when read in conjunction with the accompanying drawings.

DETAILED DESCRIPTION OF PREFERRED EMBODIMENTS

The embodiments of this invention will be described with reference to the accompanying drawings.

Figure 2:
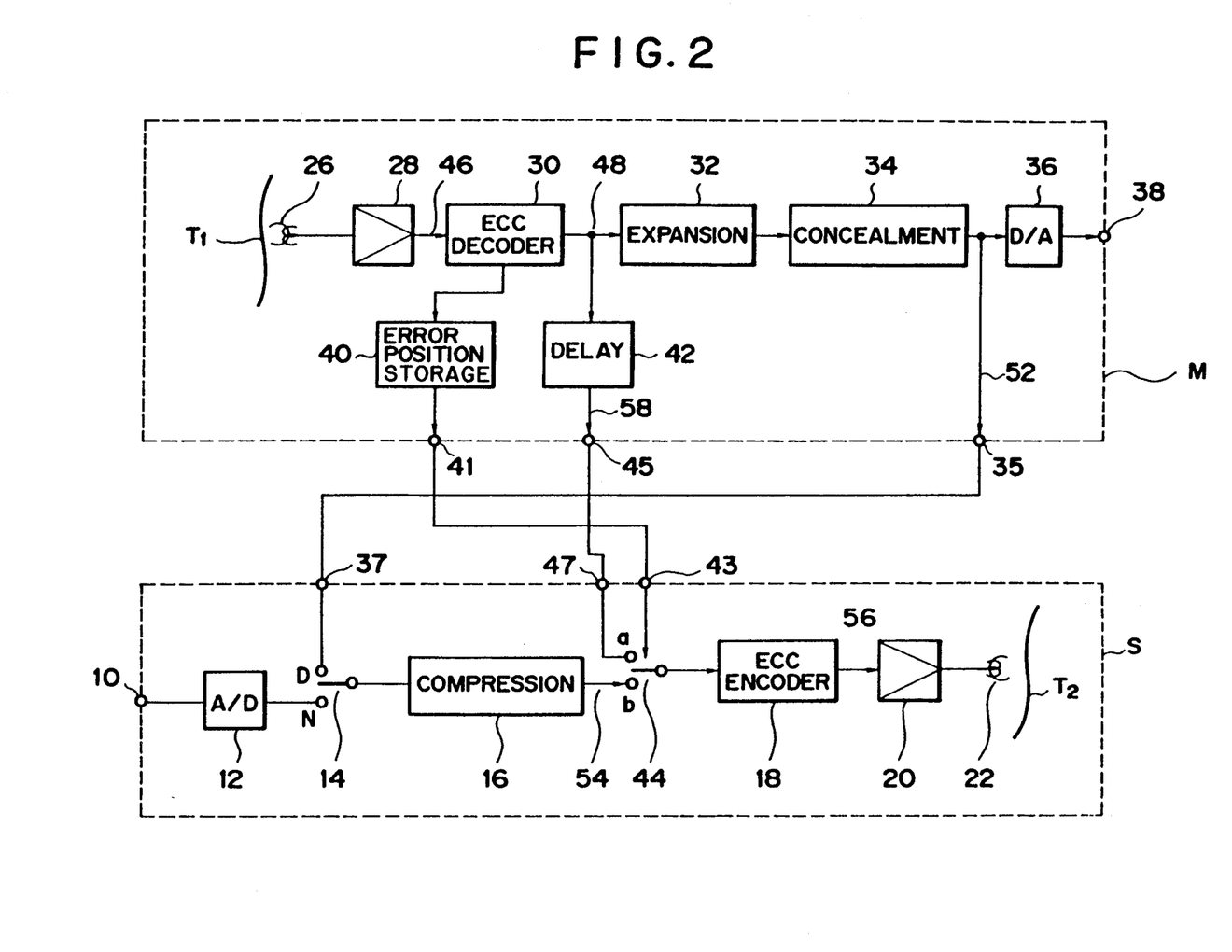
FIG. 2 is a block diagram showing the structure of a dubbing system according to an embodiment of this invention.

FIG. 2 is a block diagram showing the structure of a dubbing system according to an embodiment of this invention. In FIG. 2, similar constituent elements to those shown in FIG. 1 are represented by using identical reference numerals. Also in FIG. 2, only the reproducing system of the master VTR (M) and the recording system of the slave VTR (S) are shown.

An ECC decoder 30 supplies a flag to an error position storage circuit 40, the flag representing whether or not an error code is not correctable. The circuit 40 stores the position, in each data frame, of an uncorrectable error code at the time when a concealment circuit 34 outputs the uncorrectable error code, i.e., a concealed code, the circuit 40 supplies a flag data representative of the concealed code to a terminal 41. Reference numeral 42 represents a delay circuit having a predetermined delay time to be described later, the delay circuit outputting a delayed and compressed information code train to a terminal 45.

A switch 44 selectively applies to an ECC encoder 18 either a code train delayed by the delay circuit 42 and inputted via a terminal 47, or a code train outputted from a compression encoding circuit 16. The switch 44 is controlled by the flag data supplied from the error position storage circuit 40 and inputted via a terminal 43.

The operations of ordinary recording and reproducing are the same as FIG. 1. The operation of dubbing will be mainly described below. FIGS. 3A to 3E are schematic diagrams showing code trains at various circuit portions of FIG. 2. In FIGS. 3A to 3E, Di (i=1 to n) represents a data, Pi represents a parity check bit, EDi represents a data having an error code left after error correction by the ECC encoder 30, and Fi represents an error flag representative of whether each code after error correction is valid or not.

The error flag Fi is a data which becomes "1" when the corrected code data Di has a code error left (uncorrectable) and "0" when there is no code error left (completely corrected or there is no code error). In FIGS. 3A to 3E, it is assumed that the data $D_2$ has an uncorrected error code, and that code errors, if any, of other code data have been completely corrected by the ECC encoder 30.

Figure 3A:
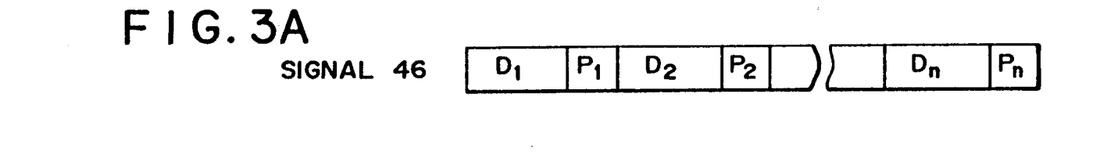
FIGS. 3A to 3E are schematic diagrams showing the state of code trains at various circuit portions shown in FIG. 2.

FIG. 3A shows a code train inputted to the ECC encoder 30 at the first dubbing. Specifically, the code train includes a predetermined symbol number of codes Di (i=1 to n) and a predetermined symbol number of parities Pi. For example, in a Read Solomon (36, 32) system, 4 symbol parity check bits are added to a 32 symbol code train to allow 2 symbol code errors to be corrected.

Figure 3B:
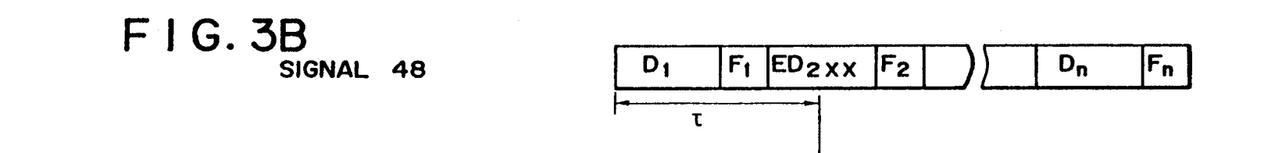

FIGS. 3B schematically shows a code train 48 outputted from the ECC encoder 30. A code error of the code data $D_1$ is corrected using the parity $P_1$, and at the same time when the next code data D2 is inputted to the ECC encoder 30. (Strictly speaking, it is necessary to consider the error correction decoding time. However, it is not essential in this embodiment, so it is neglected), the corrected code data $D_1$ and the following error flag F1 representative of a presence or absence of a code error are outputted. Since a code error of the code data $D_1$ is not left, the error flag $F_1$ is "0".

With respect to the code data $D_2$, the ECC encoder 30 is unable to correct all code errors. Therefore, a code data $ED_2$ including a code error is outputted with the error flag $F_2$ of "1". Code errors, if any, of the code data $D_3$ to Dn are completely corrected, so the error flags $F_3$ to $F_n$ are all "0".

Figure 3C:
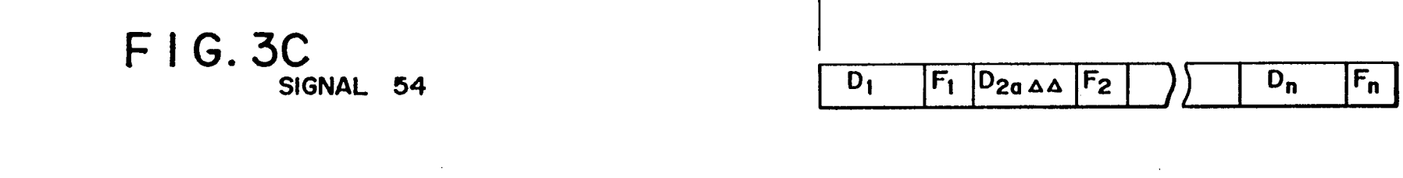

FIG. 3C shows a code train 54 outputted from the compression encoding circuit 16. This code train signal 54 is obtained such that an output 48 of the ECC encoder 30 passes through the expansion circuit 32, concealment circuit 34, and compression encoding circuit 16, thereby being expanded, concealed, and again compressed. A suffix a is added to data $D_2$ to indicate concealment by the concealment circuit 34. Namely, the code data $ED_2$ having a code error changes to the concealed code data $D_{2a}$. An output 54 of the compression encoding circuit 16 is delayed from an output of the ECC encoder 30 by a time $\tau$ which corresponds to the process time by the expansion circuit 32, concealment circuit 34, and compression encoding circuit 16. The delay time of the delay circuit 42 is set to this time $\tau$.

Figure 3D:
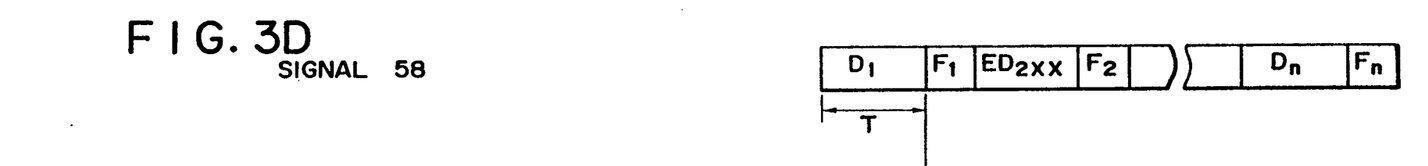

FIG. 3D shows an output signal 58 of the delay circuit 42.

The error position storage circuit 40 stores the error flag Fi set to "1" (in the embodiment, $F_2$), and selects the b contact of the switch 44 at the timing when the code data Di corresponding to the stored flag Fi (in this embodiment, $D_2$) is outputted to the terminals 35 and 45. More particular, for the code data whose error code was not correctable by the ECC encoder 30, the switch 44 selects via the b contact the code data concealed by the concealment circuit 34 and again compressed by the compression encoding circuit 16. For the code data having no code error after it is outputted from the ECC encoder 30, the switch 44 selects via the a contact the compressed information code data time-adjusted by the delay circuit 42 and having no code error.

Figure 3E:
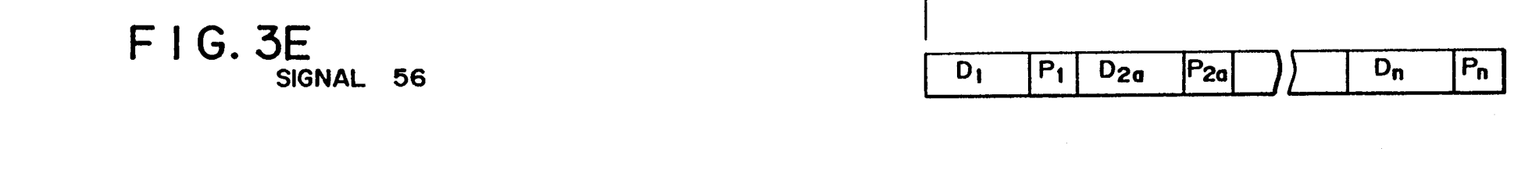

FIG. 3E shows a code train selected in the above manner (an output of the ECC encoder 18). The ECC encoder 18 adds a parity $P_{2a}$ different from the original parity $P_2$ to the concealed code data $D_{2a}$. It is apparent that the other code data $D_1$, $D_3$ to $D_n$ are added with the original parities $P_1$, $P_3$ to $P_n$.

The time difference T between the code train 58 (FIG. 3D) and the code train 56 (FIG. 3E) corresponds to the process time of the ECC encoder 18.

As described above, according to this embodiment, if a code data to be dubbed has no uncorrectable code error, the bandwidth compressed code data is dubbed. Only when a code error is left, the code data is dubbed through expansion, concealment, and second compression. Therefore, image deterioration caused by repetitive bandwidth compressions can be minimized.

Figure 4:
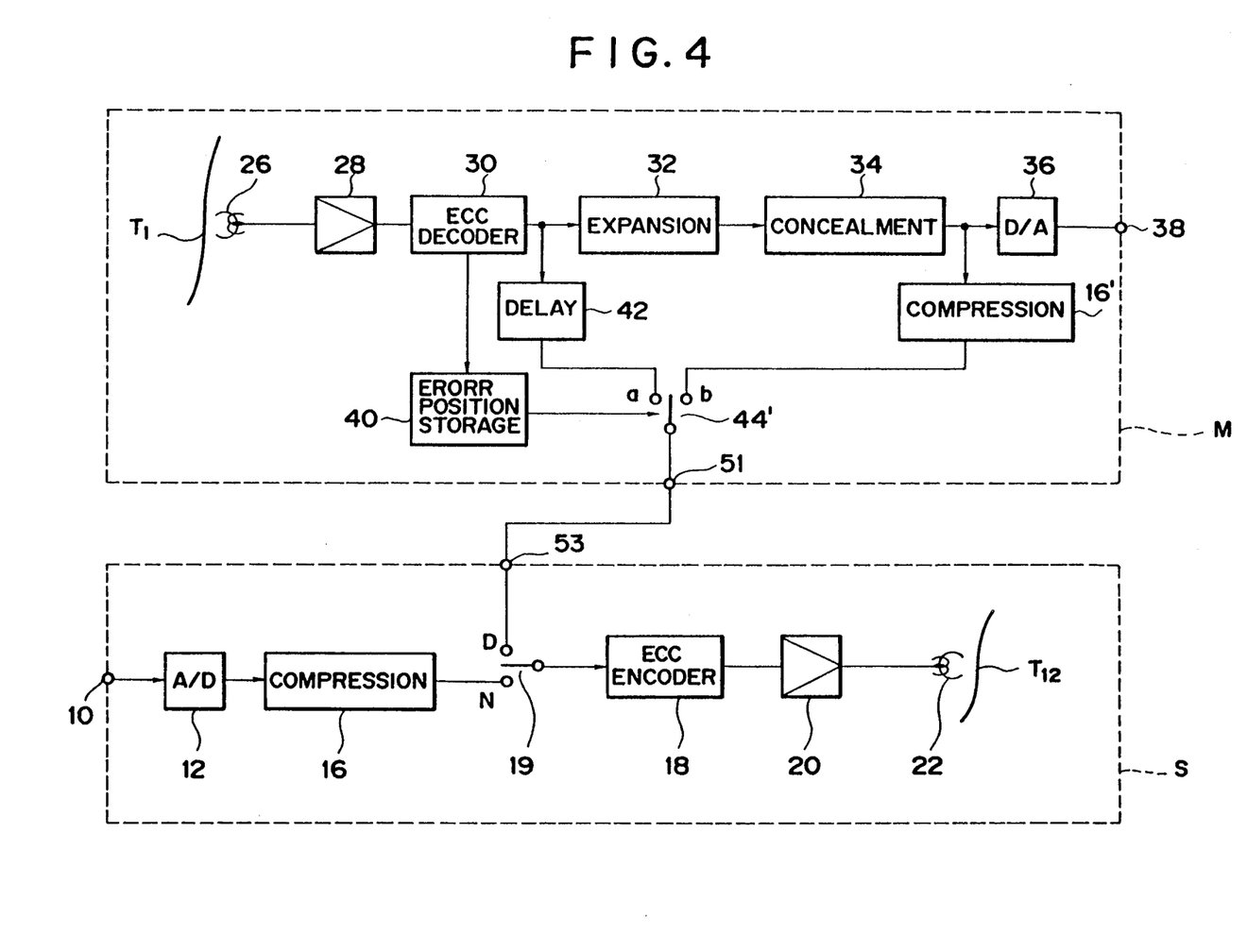
FIG. 4 is a block diagram showing the structure of a dubbing system according to another embodiment of this invention.

FIG. 4 is a block diagram showing the structure of a dubbing system according to another embodiment of this invention. In FIG. 4, similar elements having the same functions to those shown in FIG. 2 are represented by using identical reference numerals. As seen from FIG. 4, in the embodied system, there are provided within the master VTR (M) a compression encoding circuit 16' for compressing and encoding an output of a concealment circuit 34 and a switch 44' controlled by the flag data outputted from the error position storage circuit 40. In this embodiment, a dubbing code train is obtained through the switch 44' instead of the switch 44 of the system shown in FIG. 2.

A code train from the switch 44' is inputted via an output terminal 51 to an input terminal 53 of the slave VTR (S). During dubbing, instead of recording a code train outputted from the compression circuit 16 via the switch 19, a code train from the input terminal 53 is recorded. With such an arrangement, the same advantageous effects as the system shown in FIG. 2 can be obtained. In the embodied system, it is advantageous in that the number of connection lines between the master VTR (M) and the slave VTR (S) is smaller than the system shown in FIG. 2.

In the above description, a magnetic tape has been used as a recording medium. Obviously this invention is applicable to a recording and reproducing apparatus using various recording mediums such as optical disks, optomagnetic disks, and solid memories. Further, such a recording medium may be considered as a transmission line including a communication line between communication satellites. This invention is therefore applicable to repeaters with the same advantageous effects.

As easily understood from the foregoing description, the dubbing system of this invention provides a dubbing with less information deterioration, while positively using the features of digital recording and reproducing apparatus as much as possible.

What is claimed is:

1. A dubbing system including a receiver and a transmitter, comprising:
   (a) receiving means for receiving from a transmission line a compressed information code train, said compressed information code train having been compressed in information amount by compression encoding and added with an error correction code;
   (b) error correcting means for correcting a code error in said compressed information code train received by said receiving means, by using said error correction code;
   (c) expanding means for expanding the information amount of said compressed information code train outputted from said error correcting means, by means of decoding corresponding to said compression encoding;
   (d) error concealing means for concealing an information code within an information code train outputted from said expanding means, by using correlation of said information, said information code being unable to be corrected by said error correcting means;
   (e) compressing means for again compression encoding an information code train outputted from said error concealing means;
   (f) switching means for outputting an information code train outputted from said compressing means, for the information code unable to be corrected, and outputting a compressed information code train to be inputted to said expanding means, for the other information code; and
   (g) transmitting means for transmitting the information code train outputted from said switching means to another transmission line different from said transmission line.

2. A system according to claim 1, further comprising error correction encoding means for error correcting and encoding an information code train outputted from said switching means.

3. A system according to claim 1, wherein said transmission line includes a magnetic recording medium, and said receiving means includes reproducing means for reproducing said information code train from said magnetic recording medium.

4. A system according to claim 3, wherein said other transmission line includes another magnetic recording medium, and said transmitting means includes recording means for recording an information code train outputted from said switching means into said other magnetic recording medium.

5. A system according to claim 1, further comprising delay means for delaying said compressed information code train to be inputted to said expanding means by a predetermined time, and supplying said delayed code train to said switching means.

6. A system according to claim 5, wherein said predetermined time is determined by the time required for the process by said expanding means and said error concealing means.

7. A system according to claim 1, wherein said receiver and said transmitter is discretely configured, and said receiver includes a first output terminal for outputting said compressed information code train to be inputted to said expanding means, and a second output terminal for outputting an information code train outputted from said error concealing means.

8. A system according to claim 7, wherein said transmitter includes a first input terminal for inputting said compressed information code train from said first output terminal and supplying said compressed information code train to said switching means, and a second input terminal for inputting said information code train from said second output terminal and supplying said information code train to said compressing means.

9. A system according to claim 8, wherein said receiver further includes a third output terminal for outputting an error flag, said error flag being generated by said error correcting means and representing whether there is information unable to be corrected within said compressed information code train, and said transmitter further includes a third input terminal for inputting said error flag from said third output terminal to control said switching means.

10. A system according to claim 8, wherein said transmitter further includes a fourth input terminal for inputting another information code train, and a switching circuit for selectively inputting to said compressing means said other information code train from said fourth input terminal and said information code train from said second input terminal.

11. A system according to claim 1, wherein said receiver and said transmitter are discretely configured, and said receiver includes an output terminal for outputting said information code train outputted from said switching means.

12. A system according to claim 11, wherein said receiver includes said switching means, and said switching means is controlled by an error flag, said error flag being generated by said error correcting means and representing whether there is information unable to be corrected within said compressed information code within.

13. A system according to claim 11, wherein said transmitter includes a first input terminal for inputting said information code train from said output terminal, a second input terminal for inputting another information code train, a compression circuit for compressing encoding said other information code train from said second input terminal, and a switching circuit for selectively outputting either said information code train from said compression circuit or said information code train from said first input terminal.

14. An information reproducing apparatus, comprising:
   (a) reproducing means for reproducing a compressed information code train from a recording medium, said compressed information code train having been compressed in information amount by compression encoding and adding an error correction code;
   (b) error correcting means for correcting a code error in said compressed information code train reproduced by said reproducing means, by using said error correction code;
   (c) expanding means for expanding the information amount of said compressed information code train outputted from said error correcting means, by means of decoding corresponding to said compression encoding;
   (d) error concealing means for concealing an information code within an information code train outputted from said expanding means, by using correlation of said information, said information code being unable to be corrected by said error correcting means;
   (e) a first output terminal for outputting said compressed information code train to be inputted to said expanding means, with a delay of a predetermined time; and
   (f) a second output terminal for outputting an information code train outputted from said error concealing means.

15. A system according to claim 14, further comprising a third output terminal for outputting an error flag, said error flag being formed by said error correcting means and representing whether there is information unable to be corrected within said compressed information code train.

16. An information reproducing apparatus, comprising:
   (a) reproducing means for reproducing a compressed information code train from a recording medium, said compressed information code train having been compressed in information amount by compression encoding and added with an error correction code;
   (b) error correcting means for correcting a code error in said compressed information code train reproduced by said reproducing means, by using said error correction code;
   (c) expanding means for expanding the information amount of said compressed information code train outputted from said error correcting means, by means of decoding corresponding to said compression encoding;
   (d) error concealing means for concealing an information code within an information code train outputted from said expanding means, by using correlation of said information, said information code being unable to be corrected by said error correcting means;
   (e) compressing means for compressing again said information code train outputted from said error concealing means;
   (f) switching means for outputting an information code train outputted from said compressing means, for the information code unable to be corrected, and outputting compressed information code train to be inputted to said expanding means, for the other information code; and
   (g) an output terminal for outputting an information code train outputted from said switching means.

17. A system according to claim 16, wherein said switching means is controlled by an error flag, said error flag being formed by said error correcting means and representing whether there is information unable to be corrected within said compressed information code train.

18. An information reproducing apparatus, comprising:
   (a) a first input terminal for receiving a compressed information code train having been compressed in information amount by compression encoding;
   (b) a second input terminal for receiving an information code train obtained by subjecting said compressed information code train to decoding corresponding to said compression encoding and expanding the information amount of said decoded code train;
   (c) compressing means for subjecting said information code train from said second input terminal to said compression encoding;
   (d) switching means for selectively outputting either said information code train from said compressing means or said compressed information code train from said first input terminal;
   (e) error correction encoding means for encoding an information code train outputted from said switching means for error correction; and
   (f) means for recording the information code train outputted from said error correction encoding means in a recording medium.

19. A system according to claim 18, further comprising a third input terminal for receiving an error flag representing whether there is information unable to be corrected within said compressed information code train from said first input terminal, and controlling said switching means.

20. An information reproducing apparatus, comprising:
   (a) a first input terminal for receiving a compressed information code train having been compressed in information amount by compression encoding;
   (b) a second input terminal for receiving an information code train not subjected to said compression encoding;
   (c) compressing means for subjecting said information code train from said second input terminal to said compression encoding;
   (d) switching means for selectively outputting either said information code train from said compressing means or said compressed information code train from said first input terminal;
   (e) a third input terminal for receiving an error flag representing whether there is information unable to be corrected within said compressed information code train from said first input terminal, and controlling said switching means; and
   (f) means for recording the information code train outputted from said switching means in a recording medium.

* * * * *

UNITED STATES PATENT AND TRADEMARK OFFICE
CERTIFICATE OF CORRECTION

PATENT NO. : 5,267,094

DATED : November 30, 1993

INVENTOR(S) : AKIO AOKI

It is certified that error appears in the above-indentified patent and that said Letters Patent is hereby corrected as shown below:

ON TITLE PAGE

In [56] References Cited, "Ali Meyzari" should read --Ali Neyzari--.

COLUMN 2

Line 56, "code be," should read --code,--.

COLUMN 3

Line 30, "code at" should read --code. At--.

COLUMN 4

Line 3, "FIGS. 3B" should read --FIG. 3B--.
Line 6, "data D2" should read --data $D_2$--.
Line 11, "F1" should read --$F_1$--.
Line 18, "Dn" should read --$D_n$--.
Line 42, "particular," should read --particularly,--.
Line 56, "$P_n$," should read --$P_n$.--.

COLUMN 7

Line 3, "within." should read --train.--.
Line 43, "A system" should read --An apparatus--.

UNITED STATES PATENT AND TRADEMARK OFFICE
CERTIFICATE OF CORRECTION

PATENT NO. : 5,267,094

DATED : November 30, 1993

INVENTOR(S) : AKIO AOKI

It is certified that error appears in the above-indentified patent and that said Letters Patent is hereby corrected as shown below:

COLUMN 8

Line 7, "outputting" should read --outputting a--.
Line 18, "reproducing" should read --recording--.
Line 41, "A system" should read --An apparatus--.
Line 47, "reproducing" should read --recording--.

Signed and Sealed this

Twelfth Day of July, 1994

Attest:

BRUCE LEHMAN

Attesting Officer

Commissioner of Patents and Trademarks